United States Patent [19]
Shapira et al.

[11] Patent Number: 5,752,676
[45] Date of Patent: May 19, 1998

[54] SPACECRAFT WITH INTEGRATED ARRAY OF SOLAR CELLS AND ELECTRONICALLY SCANNABLE ANTENNA

[75] Inventors: Yoram Shapira, Yehuda; Harel Golombek, Netanya, both of Israel

[73] Assignee: Ramot University Authority for Applied Research & Industrial Development Ltd., Tel Aviv, Israel

[21] Appl. No.: 692,996

[22] Filed: Aug. 6, 1996

[51] Int. Cl.⁶ .................... B64G 1/44; B64G 1/66
[52] U.S. Cl. .................... 244/173; 244/158 R; 136/244
[58] Field of Search ............... 244/158 R, 173; 136/244, 245

[56] References Cited

U.S. PATENT DOCUMENTS

| | | | |
|---|---|---|---|
| 3,802,920 | 4/1974 | Salles et al. | 136/245 X |
| 3,933,323 | 1/1976 | Dudley et al. | 244/158 R X |
| 4,030,102 | 6/1977 | Kaplan et al. | 136/245 X |
| 5,169,094 | 12/1992 | Maute et al. | 244/158 R |

Primary Examiner—William Grant
Attorney, Agent, or Firm—Mark M. Friedman

[57] ABSTRACT

A spacecraft having an array of antenna elements mounted on its outer surface. Signals are transmitted and received by scanning the array electronically. Solar cells are mounted on the array elements in a manner that interferes minimally with the transmission and reception of the signals. Because the direction of transmission and reception is determined by electronic scanning, the antenna array and the solar cells are decoupled directionally without being decoupled mechanically.

6 Claims, 7 Drawing Sheets

SPACECRAFT WITH INTEGRATED ARRAY OF SOLAR CELLS AND ELECTRONICALLY SCANNABLE ANTENNA

FIELD AND BACKGROUND OF THE INVENTION

The present invention relates to unmanned spacecraft and, more particularly, to a spacecraft whose surface is covered with antenna elements, the antenna elements being further covered by solar cells.

Communication satellites inherently require at least two systems to function: a communication system for receiving and transmitting signals, and a power system for supplying power to the communication system. Two designs are commonly used for communication satellites that are powered by solar cells. The first design (FIG. 1) is called "dual spin". In this design, the outer surface of the (typically cylindrical) body 10 of the satellite is covered with solar cells 20. An antenna 30 is attached to body 10 by a mechanical linkage 40. Cylindrical body 10 spins on its axis of symmetry to provide stability, while antenna 30 remains pointing towards a target such as a ground station. In the frame of reference of body 10, antenna 30 spins in a direction opposite to the direction in which body 10 spins in an inertial frame of reference. The second design (FIG. 2) is called "three-axis" or "body stabilized". In this design, an antenna 32 is rigidly attached to the body 12 of the satellite. Solar panels 22 are attached to body 12 by mechanical linkages 42. Body 12 orients itself in space to keep antenna 32 pointed towards a target such as a ground station, while solar panels 22 are independently oriented to face the sun.

What these two designs have in common is mechanical linkages to decouple the directional orientation of the antennas from the directional orientation of the solar cells or solar panels. Mechanical linkages of this type are subject to mechanical failure. Notorious examples of such failures include the Magellan Spacecraft and the Hubble Space Telescope. The Magellan Spacecraft was partly disabled by the failure of its high gain antenna to open correctly. The Hubble Space Telescope initially was out of focus because of mechanical problems. The Hubble Space Telescope was repaired at great expense by a shuttle crew. Similar repairs are economically unfeasible for commercial communication satellites.

There is thus a widely recognized need for, and it would be highly advantageous to have, a solar powered spacecraft in which the operational directional orientations of the communication system and the power system are decoupled by means other than the failure-prone mechanical means of the present art.

SUMMARY OF THE INVENTION

According to the present invention there is provided a spacecraft comprising: (a) a surface; (b) a plurality of antenna elements attached to the surface; and (c) a plurality of solar cells attached to the antenna elements.

The concept of the present invention is an extension of the conventional technology of electronically scannable antennas, such as phased array antennas. A phased array antenna is a fixed antenna made of many individual antenna elements set in a two dimensional array. A directional beam is broadcast from a phased array antenna by broadcasting a signal at different amplitudes and relative phases from the various elements. Typically, this is done by varying the relative phases linearly across the array: the individual broadcasts interfere destructively with each other and cancel each other out in all directions except the direction desired for the beam. Conversely, signals may be received directionally by suitable variations of the phases with which received signals from the various elements are combined.

According to preferred embodiments of the present invention, the outer surface of a (typically cylindrical) spacecraft is covered with antenna elements, and the antenna elements are covered with solar cells in a way that interferes minimally with transmission or reception of electromagnetic (typically microwave) energy by the antenna elements. The spacecraft spins to provide orientational stability, and the antennas are scanned electronically, in a manner similar to the way phased array antennas are scanned, to direct a transmission beam at a target, or to receive signals directionally, despite the rotational motion of the spinning spacecraft. Thus, the solar cells and the communication system are decoupled directionally without being decoupled mechanically. In addition to being more reliable than the prior art spacecraft, the present invention is lighter and less expensive, both of the latter being additional important considerations in the design of commercial satellites.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a solar powered spacecraft which is more reliable, lighter, and less expensive than present spacecraft with similar capabilities. Specifically, in the present invention, the solar power system and the communication system are directionally decoupled without the use of mechanical linkages.

The principles and operation of a spacecraft according to the present invention may be better understood with reference to the drawings and the accompanying description.

Figure 1:
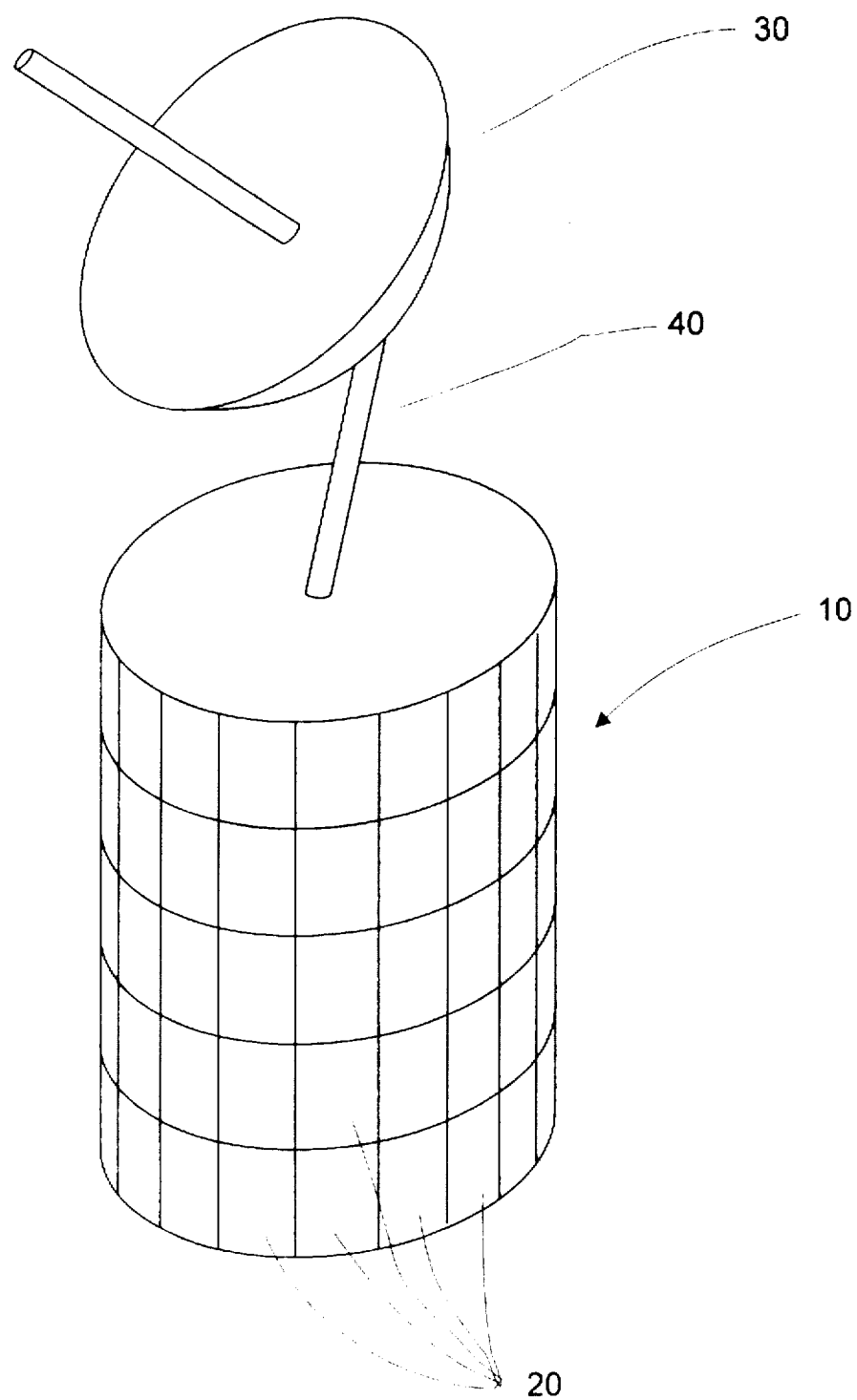
FIG. 1 is a schematic diagram of a dual spin spacecraft.
Figure 2:
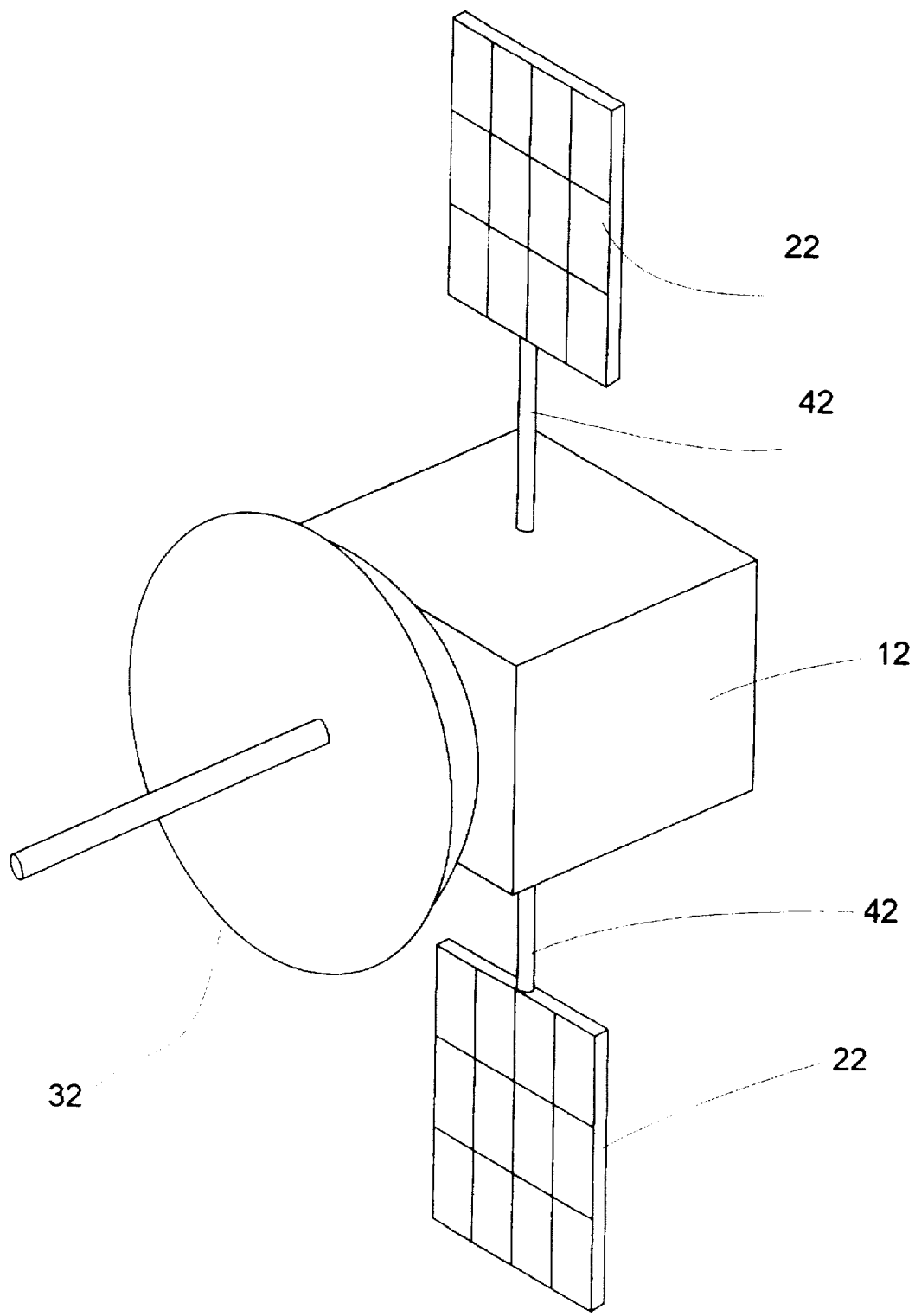
FIG. 2 is a schematic diagram of a three-axis spacecraft.
Figure 3:
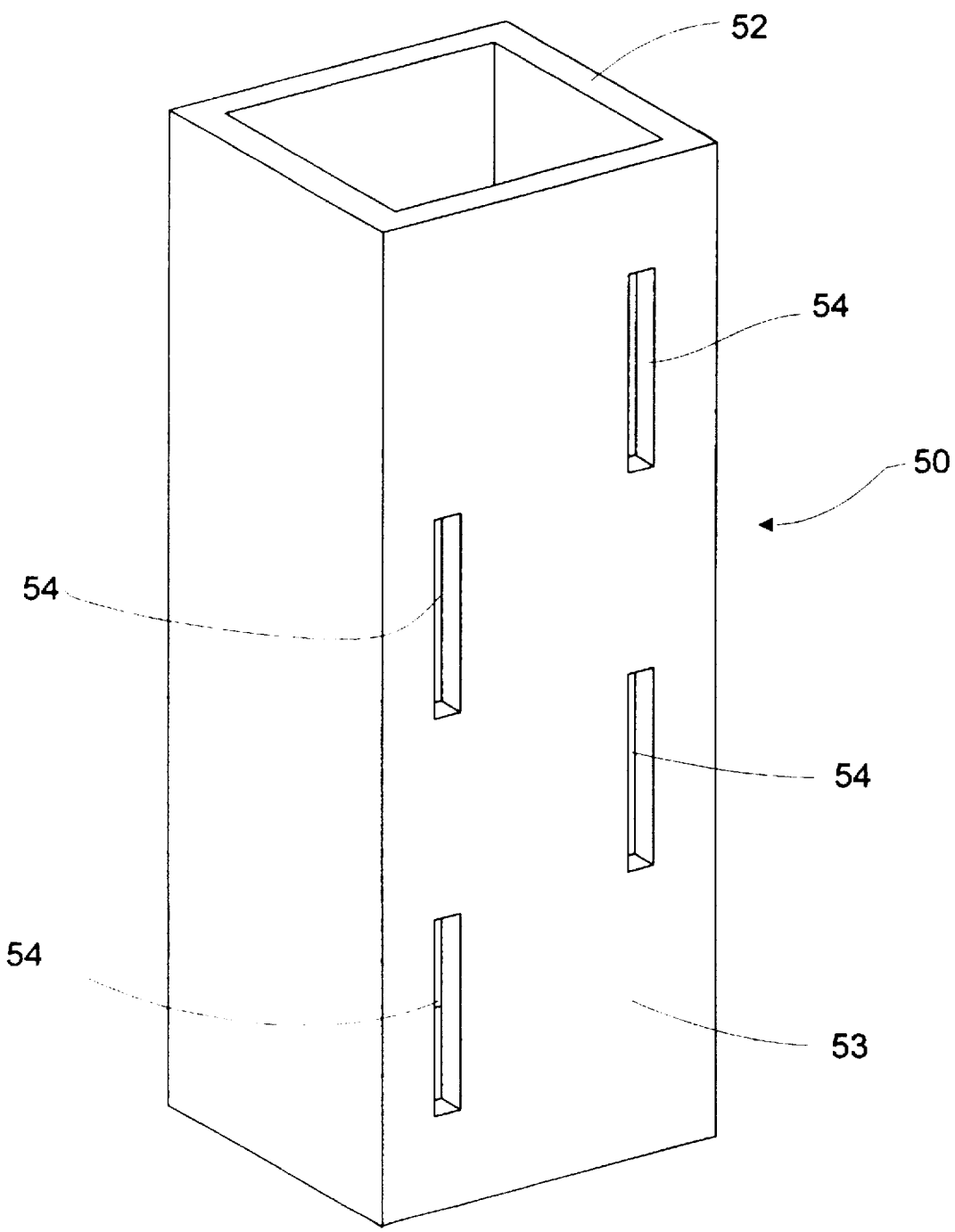
FIG. 3 is a perspective view of a slotted waveguide antenna element.

Referring now to the drawings, FIG. 3 shows a typical antenna element of the present invention, in this case a slotted waveguide antenna element 50. Slotted waveguide 50 is a metal (typically copper or aluminum) pipe 52 of rectangular cross section. In one face 53 of pipe 52 are several slots 54. The size and spacing of slots 54 are chosen according to the carrier frequency and bandwidth of the signals to be transmitted and received, in a way well known to those skilled in the art. The scope of the present invention is not limited to slotted waveguides, but includes all antenna elements that can be covered by solar cells with minimal interference, for example, microstrip antennas.

Figure 4:
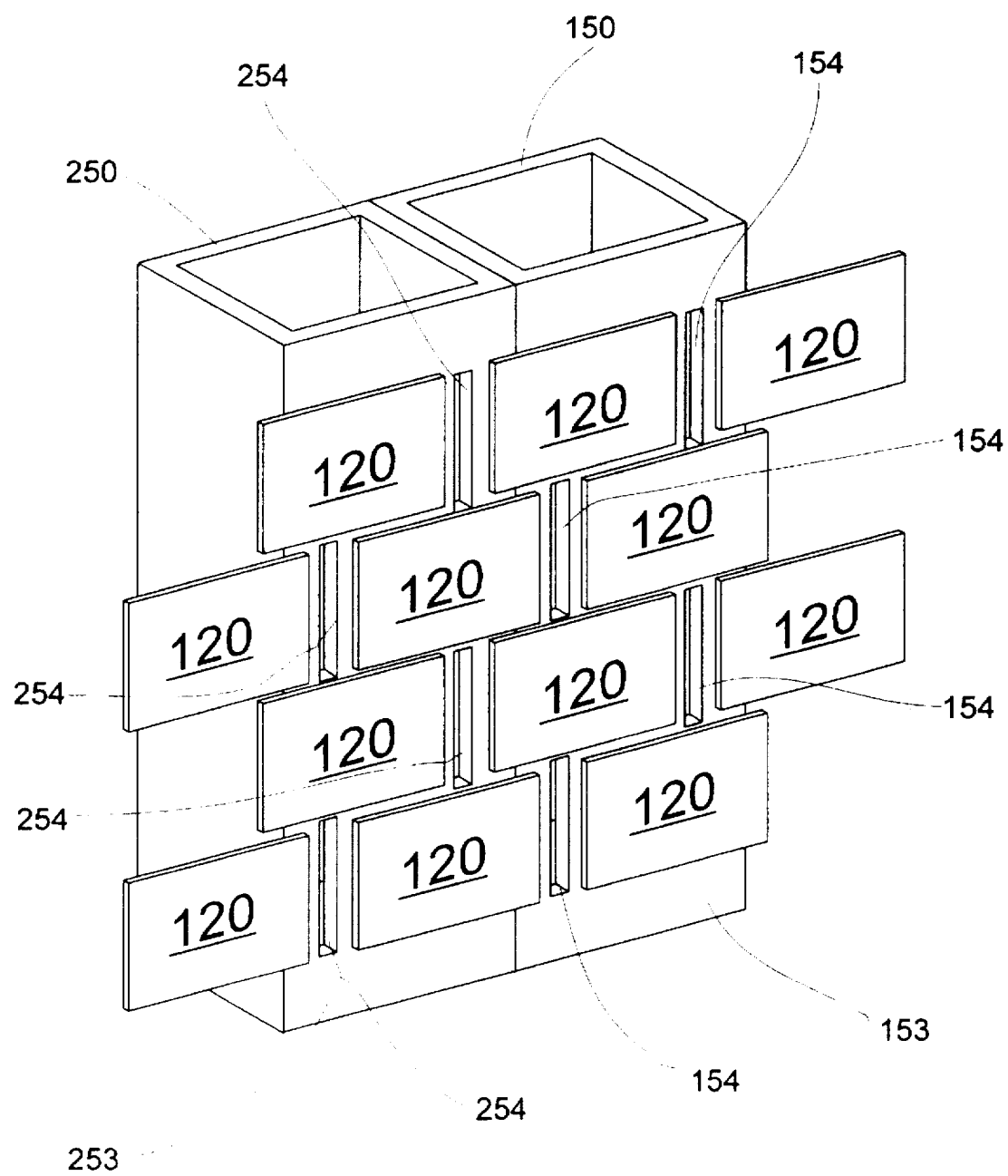
FIG. 4 is a perspective view of two slotted waveguide antenna elements with rectangular solar cells mounted on their slotted surfaces.
Figure 5:
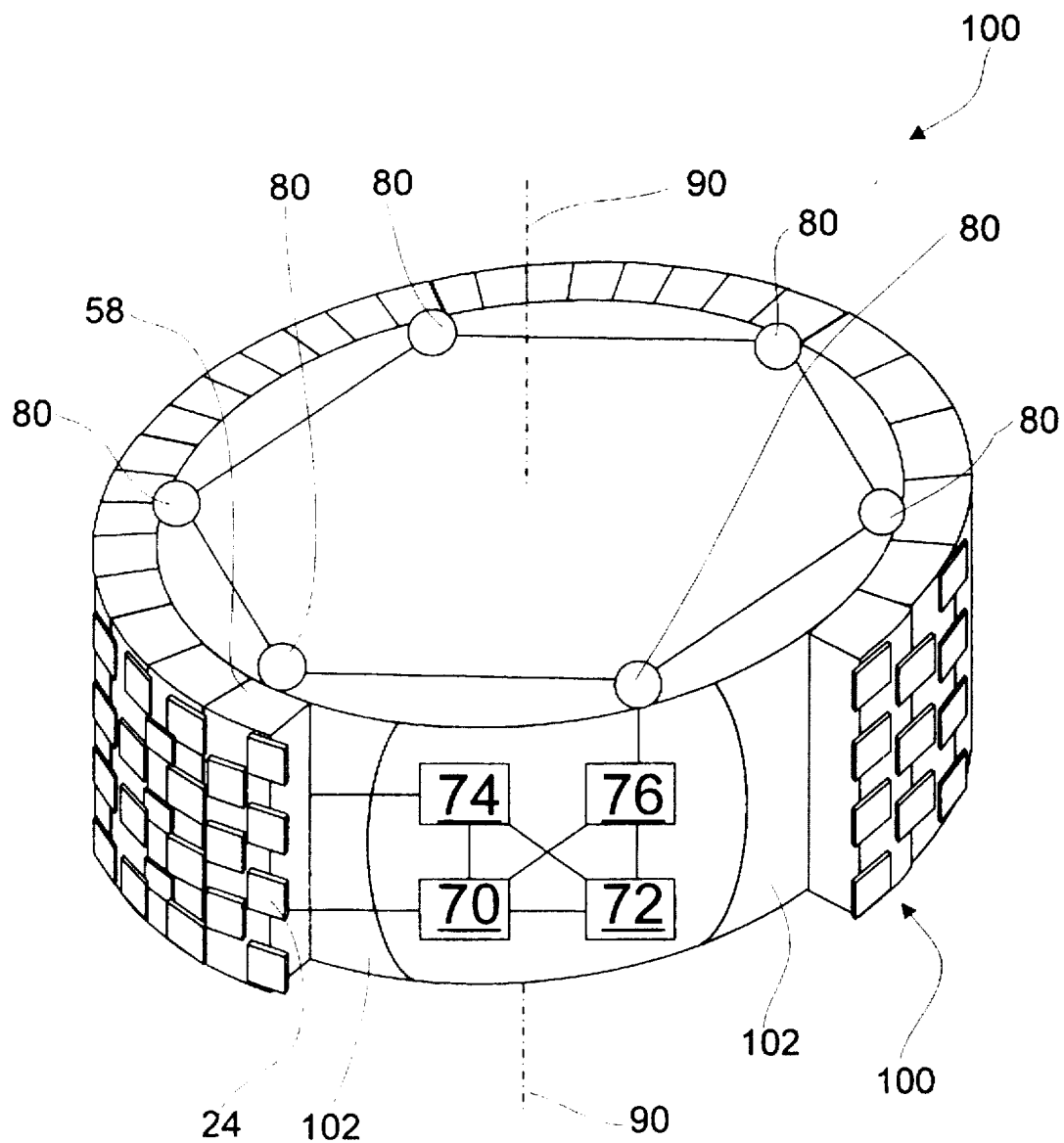
FIG. 5 is a schematic cut-away view of a spacecraft according to the present invention.

FIG. 4 shows two slotted waveguides 150 and 250, with their slotted surfaces 153 and 253 substantially covered with solar cells 120, but leaving gaps, between solar cells 120, that expose slots 154 and 254, so that signals may be transmitted and received via slots 154 and 254 with minimal interference from solar cells 120. FIG. 5 is a schematic cutaway view of a cylindrical spacecraft 100 whose outer cylindrical surface 102 is covered with slotted waveguides and solar cells in the manner of FIG. 4: substantially all of cylindrical surface 102 is covered with slotted waveguides, with their slotted surfaces facing outwards; and the exposed area of the slotted surfaces is covered with solar cells in the manner of FIG. 4. The electronic subsystems of spacecraft 100, including power subsystem 70, command and control subsystem 72, communication subsystem 74, and navigation subsystem 76, are represented schematically by boxes. Power subsystem 70 is connected to, and receives electrical power from, the array of solar cells. This connection is represented schematically in FIG. 5 by a line from power subsystem 70 to a solar cell 24 attached to a slotted waveguide 58 and to an adjacent slotted waveguide (not shown). Communication subsystem 74 is connected to the array of slotted waveguides. This connection is represented schematically in FIG. 5 by a line from communication subsystem 74 to slotted waveguide 58. The connections among subsystems 70, 72, 74, and 76 also are represented by lines. Navigation subsystem 76 includes a mechanism, such as a gyroscopic internal guidance system, for determining the position and orientation of spacecraft 100, and also is connected to an array of six earth sensors 80 mounted on the outside of spacecraft 100. The connection between navigational subsystem 76 and earth sensors 80 also is represented schematically in FIG. 5 by lines.

Power subsystem 70 supplies electrical power to command and control subsystem 72, communication subsystem 74, and navigation subsystem 76. Command and control subsystem 72 receives information from navigation subsystem 76 regarding the absolute position and orientation of spacecraft 100, and infers from that information the position and orientation of spacecraft 100 relative to transmission targets (to which spacecraft 100 is to transmit signals) and reception targets (from which spacecraft 100 is to receive signals). The transmission and reception targets may include ground stations on the Earth as well as other spacecraft. When transmitting a signal to a transmission target, command and control subsystem 72 feeds the signal and the target direction to communication subsystem 74. Communication subsystem 74 feeds the signal to the antenna elements on surface 102 of spacecraft 100 that face the transmission target, with appropriate relative amplitudes and phase delays to direct the transmission of the signal towards the transmission target. As spacecraft 100 spins on axis 90, the side of surface 102 that faces the transmission target changes continuously, and communication subsystem 74 changes the relative amplitudes and phases accordingly. Similarly, when receiving a signal from a reception target, communication subsystem 74 combines signals from the antenna elements on surface 102 of spacecraft 100 that face the reception target, with appropriate relative amplitudes and phases, to receive signals specifically from the direction of the reception target.

Figure 6:
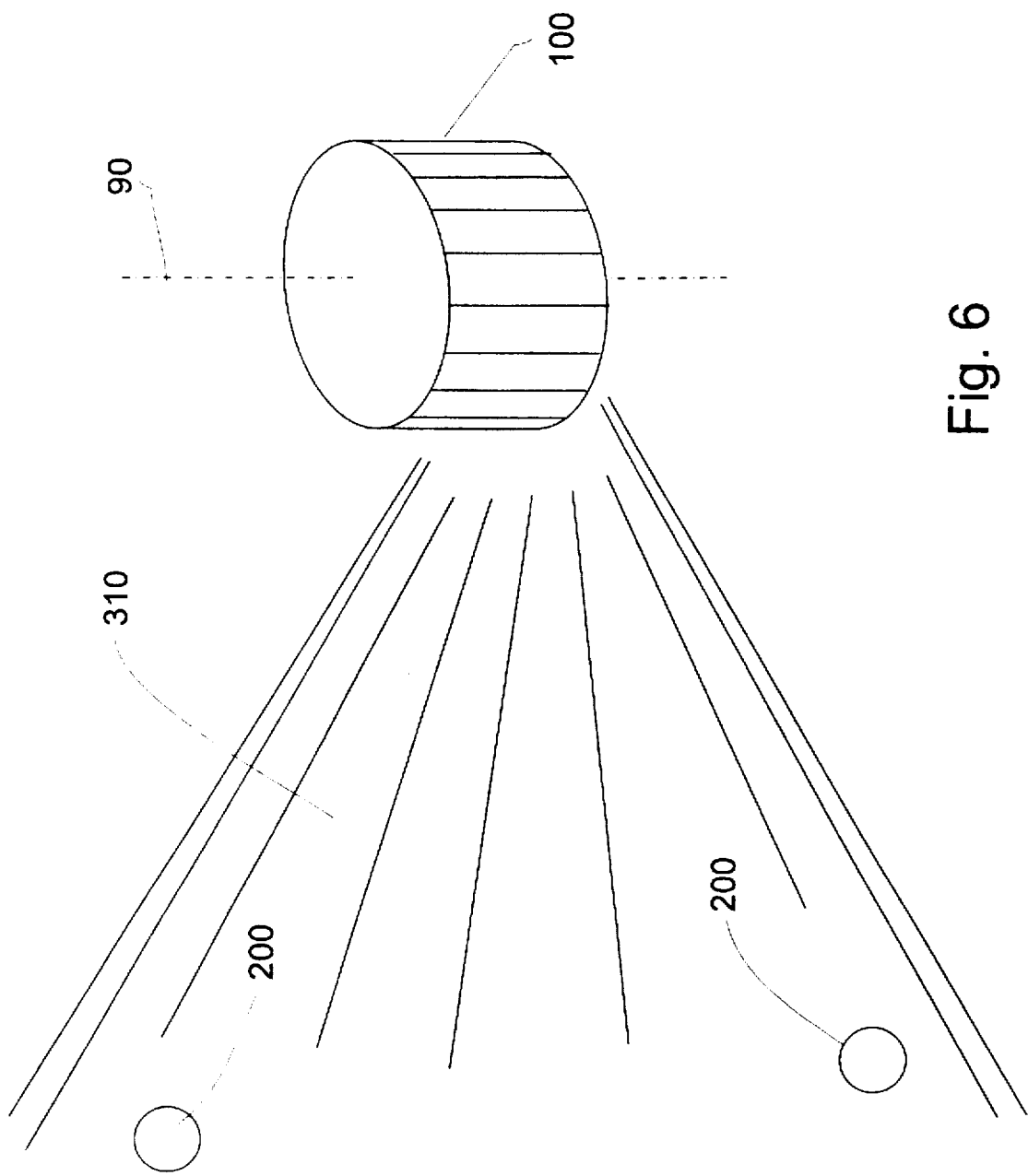
FIG. 6 is an illustration of the spacecraft of FIG. 5 transmitting and receiving in a planar beam.
Figure 7:
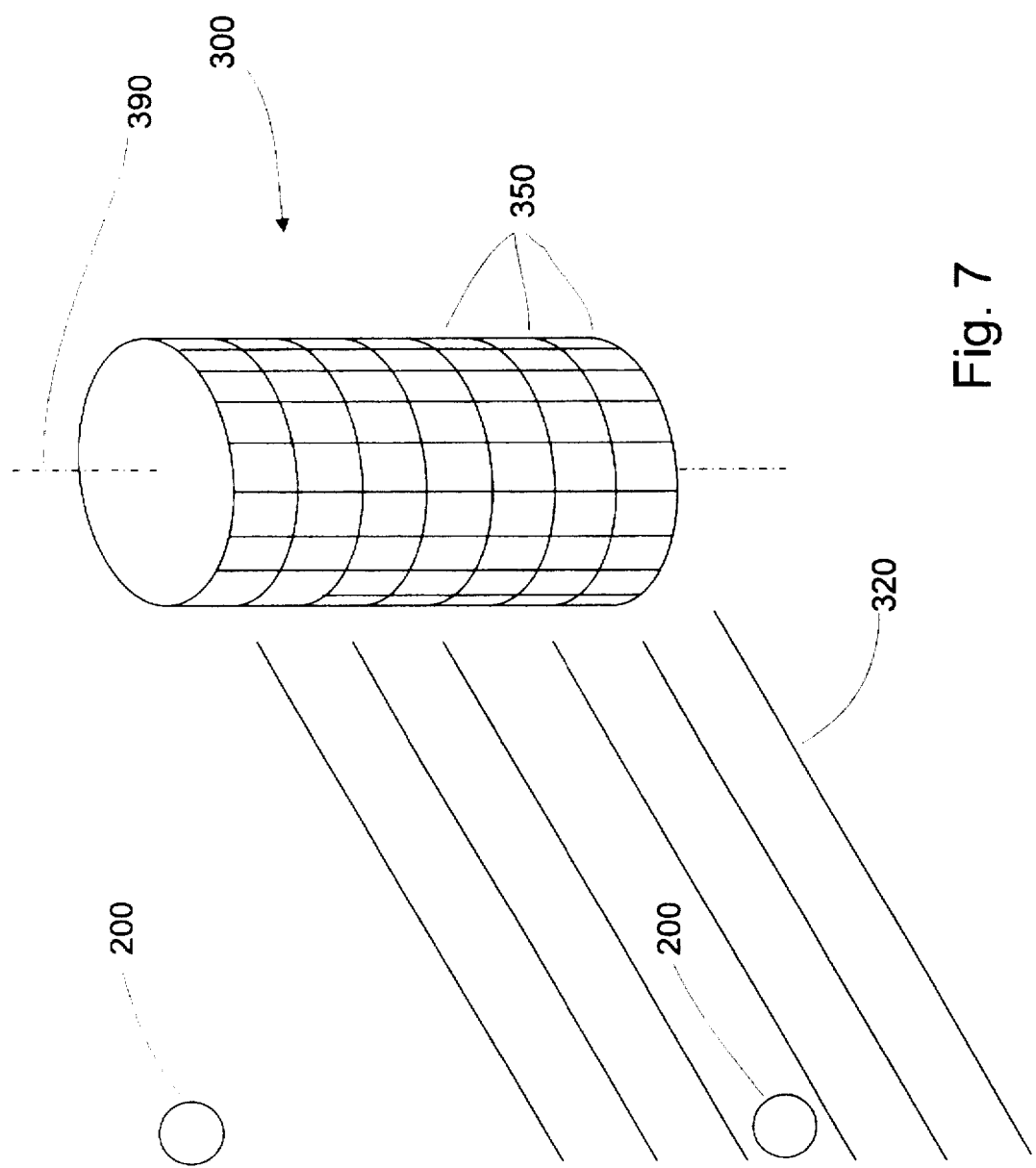
FIG. 7 is an illustration of another spacecraft according to the present invention, transmitting and receiving in a more focused beam.

For schematic simplicity, FIG. 5 shows a single row of antenna elements, mounted in a circle around surface 102 of spacecraft 100. This single row constitutes a one dimensional array of antenna elements. As shown in FIG. 6, this one dimensional array is capable of transmitting and receiving signals in a planar beam 310, parallel to axis 90, that is focused only transversely to axis 90. Because planar beam 310 may intersect more than one target 200, preferred embodiments of the present invention include multiple rows of antenna elements. FIG. 7 shows a spacecraft 300 whose outer cylindrical surface is covered by multiple rows 350 of antenna elements. Multiple rows 350 constitute a two dimensional array, which is capable of transmitting and receiving signals in a beam 320 that is focused both transversely and longitudinally with respect to axis 390, thereby transmitting to and receiving from only one of targets 200.

While the invention has been described with respect to a limited number of embodiments, it will be appreciated that many variations, modifications and other applications of the invention may be made.

What is claimed is:

1. A spacecraft comprising:
   (a) a surface;
   (b) a plurality of antenna elements mounted on said surface; and
   (c) a plurality of solar cells mounted on an exposed face of said antenna elements.

2. The spacecraft of claim 1, further comprising at least one axis of symmetry, wherein at least a portion of said surface is substantially parallel to one of said at least one axis of symmetry, and wherein said plurality of antenna elements covers at least a majority of said portion of said surface.

3. The spacecraft of claim 2, wherein said plurality of antenna elements has an exposed area, and wherein said plurality of solar cells covers at least a majority of said exposed area.

4. The spacecraft of claim 1, further comprising:
   (a) at least one navigational mechanism for orienting the spacecraft with respect to at least one target; and
   (b) at least one mechanism for scanning said antenna elements, thereby transmitting outgoing signals towards said at least one target and receiving incoming signals from said at least one target.

5. The spacecraft of claim 4, wherein at least one of said at least one scanning mechanism scans said antenna elements electronically.

6. The spacecraft of claim 1, wherein said antenna elements are slotted waveguides.

* * * * *